UNITED STATES PATENT OFFICE.

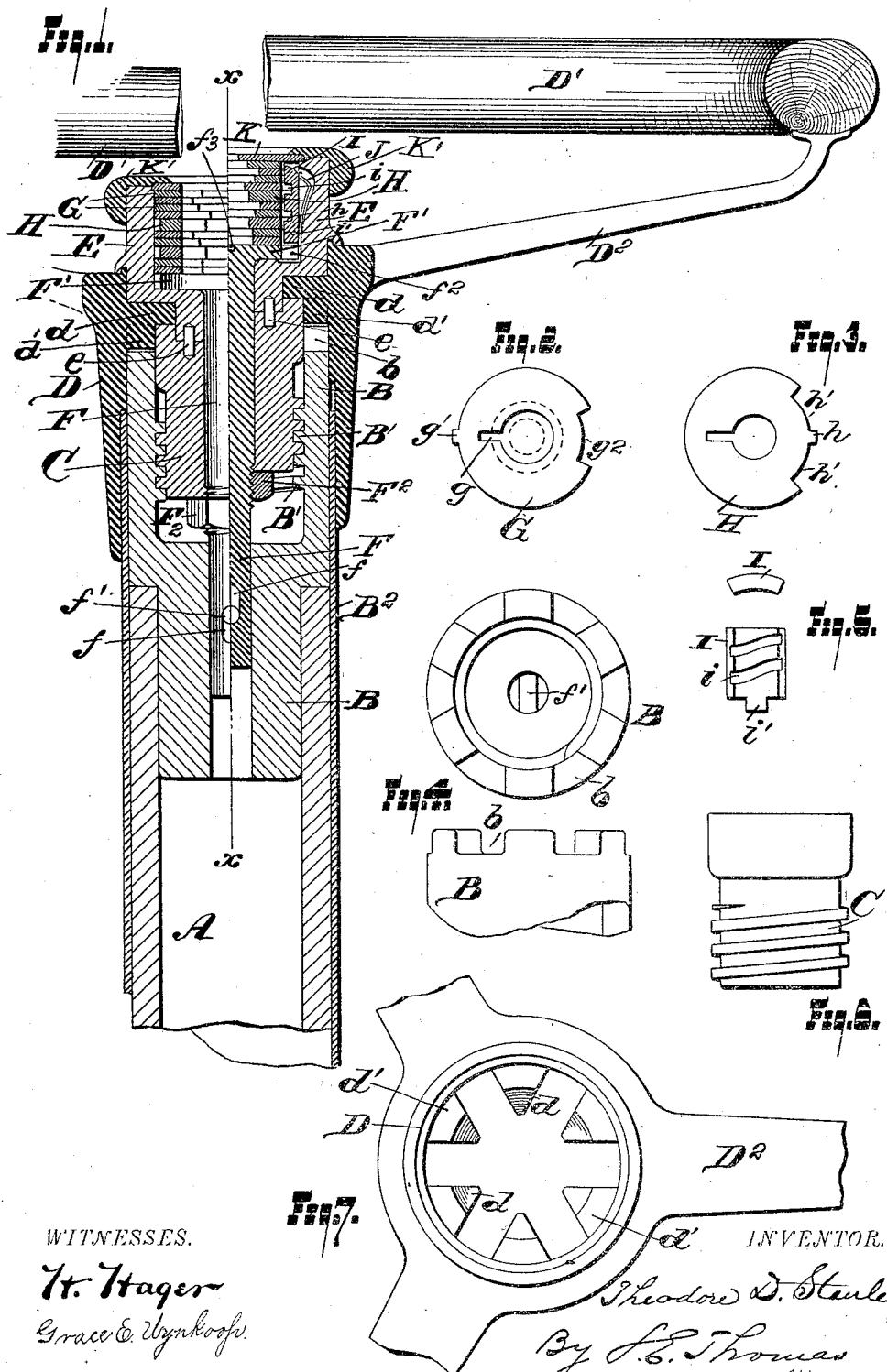

THEODORE D. STANLEY, OF DETROIT, MICHIGAN.

STEERING-WHEEL LOCK.

985,468.

Specification of Letters Patent. Patented Feb. 28, 1911.

Application filed May 9, 1910. Serial No. 560,355.

*To all whom it may concern:*

Be it known that I, THEODORE D. STANLEY, citizen of the United States, residing at Detroit, county of Wayne, State of Michigan, have invented a certain new and useful Improvement in Steering-Wheel Locks, and declare the following to be a full, clear, and exact description of the same, such as will enable others skilled in the art to which it pertains to make and use the same, reference being had to the accompanying drawings, which form a part of this specification.

My invention relates to an improvement in locks for steering wheels for automobiles, and its object is to provide means whereby the steering wheel or handle may be temporarily thrown out of operative relation with the steering post,—the purpose being to put the steering mechanism out of commission when the owner leaves the automobile in order that it cannot be driven by anyone not authorized to use it.

In the drawings accompanying this specification:—Figure 1 is a vertical sectional view through the steering post and the hub of the operating wheel,—the view being divided along its central line,—one-half showing the parts in the position occupied when the operating wheel is adapted to actuate the steering post; the other and right-hand side of the view showing the position occupied by the parts when the steering wheel is uncoupled from the post. Fig. 2 is a plan view of one of the fixed annular disks or tumblers. Fig. 3 is a plan view of one of the movable annular disks or tumblers. Fig. 4 is a plan view and fragmentary side elevation of the casting secured to the upper end of the steering post. Fig. 5 is a side elevation and plan view of the bolt. Fig. 6 is a side elevation of the screw-threaded member engaging the casting shown in Fig. 4. Fig. 7 is an inverted plan view of the hub of the steering wheel.

Referring now to the letters of reference placed upon the drawings:—A indicates the steering post. B an annular casting secured to the post provided with an internal screw-threaded portion B'.

B² is a tubular sleeve incasing the steering post A and the casting B, which in automobile construction is usually formed of brass.

C is a screw-threaded member (shown in detail in Fig. 6) engaging the internal screw-threaded portion B' of the casting B.

D is the hub of the steering wheel D';— the wheel being secured to the radiating spokes D² of the hub in the usual manner.

d is a stepped mutilated annular flange (shown in detail in Fig. 7) formed integral with the hub and over-lapping the upper end of the screw-threaded member C.

E is a cup-shaped element mounted on the end of the screw-threaded member C to which it is engaged by the pins e. The inner portion of the stepped flange d is embraced between the upper end of the screw-threaded member C and the cup-shaped element E;— the lower stepped portion d' of the flange being adapted to enter the notches b formed on the upper end of the casting B.

F is a spindle sleeved within the casting B having at its upper end a flange F' engaging the lower wall of the cup-shaped element E.

F² is a nut engaging the screw-threaded portion of the spindle and bearing upon the underside of the screw-threaded member C whereby the cup-shaped element and screw-threaded member are secured together.

f is a slot formed in the spindle, and f' is a pin projecting through said slot and engaging the walls of the casting B, by means of which the spindle is held against rotation but is free to reciprocate within the limits of its slotted portion.

G are a plurality of stationary annular disks or wards housed in the cup-shaped portion of the element E, each provided with a radiating slot g for the passage of a key (not shown) or other operating device. These several disks are held against rotation by the projecting ear g' formed on the periphery of the disk which enter a complementary depression (not shown) formed in the inner wall of the cup-shaped element. H denotes a plurality of rotatable annular disks or wards also housed within the cup-shaped element, which may be spaced apart by the fixed disks G. It will be readily understood that the several fixed and rotatable disks are adapted to be grouped in innumerable combinations whereby different key formations will be required to operate the locking mechanism of different machines.

I is a bolt arc-shaped in cross-section having an internal spiral way $i$ to receive the projecting ear $h$ formed on the disk H. As indicated at $g^2$ in Fig. 2, the fixed disks G are notched for the passage of the bolt I. So also the rotatable disks H are notched as indicated at $h'$ in Fig. 3, to accommodate the bolt I which is raised or lowered by turning the disks H to the right and left by means of a suitable key. Projecting from the lower end of the bolt I is an ear $i'$ adapted to enter a notch $f^2$ formed in the flange F' of the spindle F.

J is a spring housed in the recess formed in the cup-shaped element E adapted to engage the bolt I to secure it against displacement;—particularly when the automobile is in use.

K is an annular cover plate covering the plurality of disks G and H;—and K' is a flange portion or operating handle, preferably milled on its edge, having a projecting rim over-lapping the cover plate K;—said milled portion being engaged with the cup-shaped portion whereby the latter may be manually rotated.

Having denoted the several parts by reference letters, I will now describe the operation of my device.

As previously indicated the left-hand portion of Fig. 1 shows a steering wheel in locked relation with the steering post while the right-hand portion of Fig. 1 shows the wheel free to turn,—the steering mechanism being inoperative. We will assume that the wheel is first in the locked position shown in the left-hand side of the figure and that it is desired to throw the steering wheel out of commission. This result is accomplished by entering a properly formed key in the central opening formed in the several disks G and H,—the end of the key projecting into the notch $f^3$ formed in the upper end of the spindle F. The key is now turned which action serves to rotate the movable disks H whereupon the ears $h$ of the disks H enter the spiral way of the bolt I forcing the bolt upward in the position shown in the right-hand side of the figure, thereby lifting the ear $i'$ out of the notch $f^2$ of the spindle F. The bolt I being released from its locked relation with the spindle, the cup-shaped element E mounted upon the upper end of the screw-threaded member C is free to turn. Now by manually rotating the cup-shaped element the screw-threaded member secured thereto may be raised and with it the hub of the steering wheel, as shown in the right-hand side of the figure. This action lifts the lower stepped portion $d'$, of the mutilated flange of the hub, out of its locked relation with the notched casting B mounted upon the upper end of the steering post, whereby the steering wheel may freely turn without operating the steering post.

Upon the steering wheel being raised out of locked relation with the steering post, the bolt I is returned to its initial position by the reversed operation of the key which causes the rotatable disks to force the bolt back to the position initially occupied. The key may then be withdrawn leaving the device locked against unlawful use of the automobile. It will thus be seen that the cup-shaped element cannot be manually rotated to return the steering wheel to its locked position until the key is inserted and the bolt lifted out of its locked relation with the spindle. When it is desired to put the steering wheel into commission, the key is inserted as before and the bolt raised. The screw-threaded member C may now be manually turned by grasping the milled handle or rim K'. The screw-threaded member C is then turned to the position indicated in the left-hand side of Fig. 1 causing the lower step $d'$ of the mutilated flange to enter the notches formed in the upper end of the casting B thereby locking the hub in operative relation with the steering post. The key is now turned and the bolt I forced back to its initial position,—the projecting ear $i'$ of the bolt being forced into locked relation with the flange of the spindle. It will be seen that the spindle F has only a reciprocating movement, being held against rotation by the pin $f'$ which projects through the slot in the spindle;—the notch or recess $f^2$ is therefore always in proper alinement to receive the end of the bolt I. The screw-thread member C and its connecting cup-shaped element are free to turn upon the spindle, by operating which the hub of the steering wheel may be locked to the steering post or thrown out of commission as desired.

Having thus described my invention, what I claim is:—

1. In a steering mechanism for vehicles, the combination with a steering post provided with projections, a wheel provided with a hub slidably mounted on said post, said hub being provided with co-acting projections, manually operated means for moving the projections of the hub into and out of engagement with the projections of the steering post, a sliding bolt for locking said manually operated means, and key operated tumblers for actuating said bolt.

2. In a steering mechanism for vehicles, an annular steering post having a notched wall at its upper end and provided with an internally formed screw-threaded portion, an element housed within said post having a screw-threaded connection therewith, means for manually operating said element whereby it may be raised or lowered, a hand wheel for operating the post provided with a hub adapted to be raised or lowered by manually operating said screw-threaded element and having lugs to interlock with the notched wall of the post, whereby upon raising or lowering said screw-threaded element the hand wheel may be released from the steering post or be engaged therewith as desired.

3. In a steering mechanism for vehicles, an annular steering post having a notched wall at its upper end and provided with an internally formed screw-threaded portion, an element housed within said post having a screw-threaded connection therewith, means for manually operating said element whereby it may be raised or lowered, a hand wheel for operating the post provided with a hub adapted to be raised or lowered by manually operating said screw-threaded element and having lugs to interlock with the notched wall of the post, whereby upon raising or lowering said screw-threaded element the hand wheel may be released from the steering post or be engaged therewith as desired, and a locking mechanism actuated by a suitable key adapted to lock said wheel in its operative and released relation to said post.

4. In a steering mechanism for vehicles, a steering post having a notched wall at its upper end, and provided with an internal threaded portion, a screw threaded member mounted in said post co-acting therewith, a hub mounted on said post provided with projections, said hub being operated by the screw threaded member to engage and disengage the projections on the hub and steering post, and means for locking said screw threaded member in its adjusted positions.

5. In a steering mechanism for vehicles, a steering post, a wheel for manually operating said post adapted to be released from operative relation therewith, means whereby the wheel may be brought into operative relation with said post and released therefrom, a locking mechanism embodying a plurality of fixed and rotatable disks perforated for the passage of a key, a sliding bolt actuated by said rotatable disks adapted to lock said wheel in both its operative and inoperative relation to the post, and a key adapted to actuate the rotatable disks.

6. In a steering mechanism for vehicles, the combination with a steering post having a notched wall at its upper end and provided with an internally screw threaded portion, a screw threaded member mounted in said post co-acting therewith, a hub mounted on said post provided with projections, said hub being operated by said screw threaded member to engage and disengage the projections on the hub and steering post, and key operative means for locking said screw threaded member in its adjusted positions.

In testimony whereof, I sign this specification in the presence of two witnesses.

THEODORE D. STANLEY.

Witnesses:
GRACE E. WYNKOOP,
SAMUEL E. THOMAS.